1970X
2 Sheets—Sheet 1.
D. PEARSON.
PRINTING PRESS.
Patented July 16, 1813.
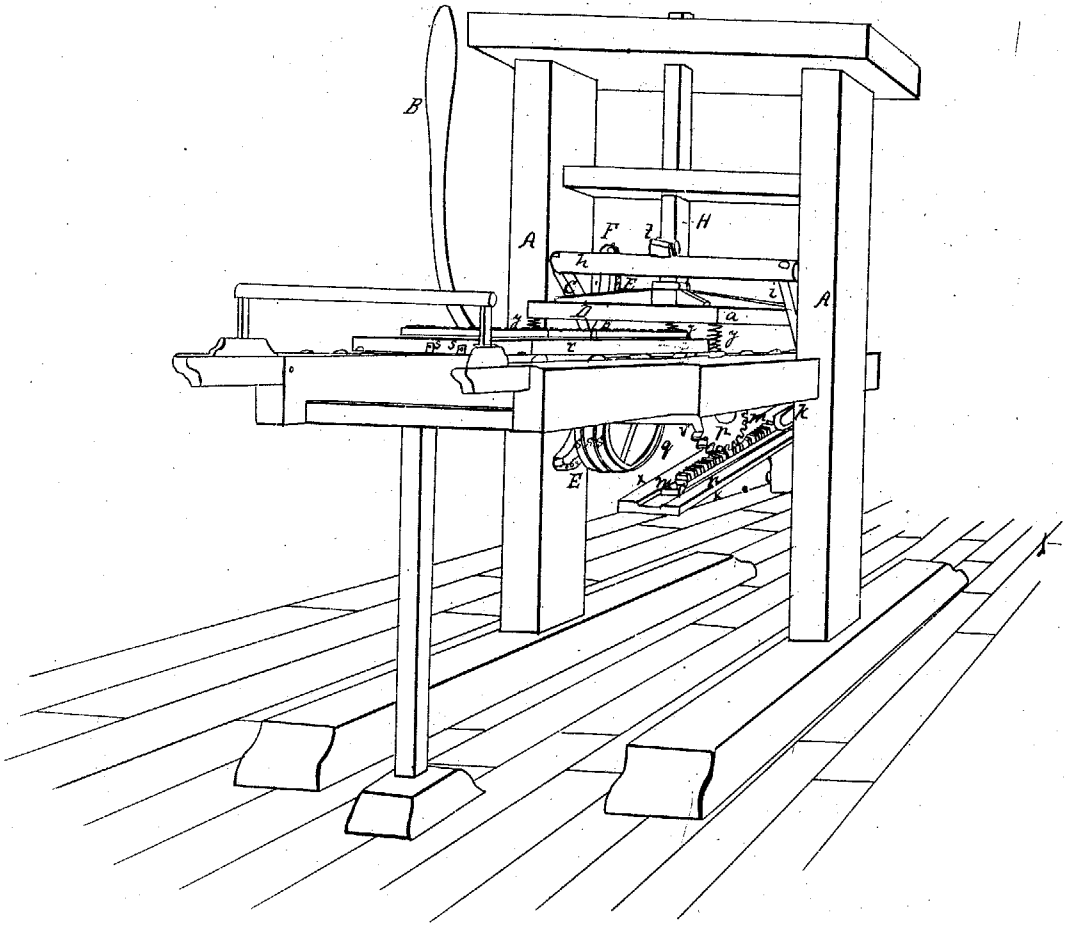
THE NORRIS PETERS CO., PHOTO-LITHO., WASHINGTON, D. C.

1970X
No.
D. Pearson. Sheet 2. 2 Sheets.
Printing Press
Patented Jul. 16. 1813.
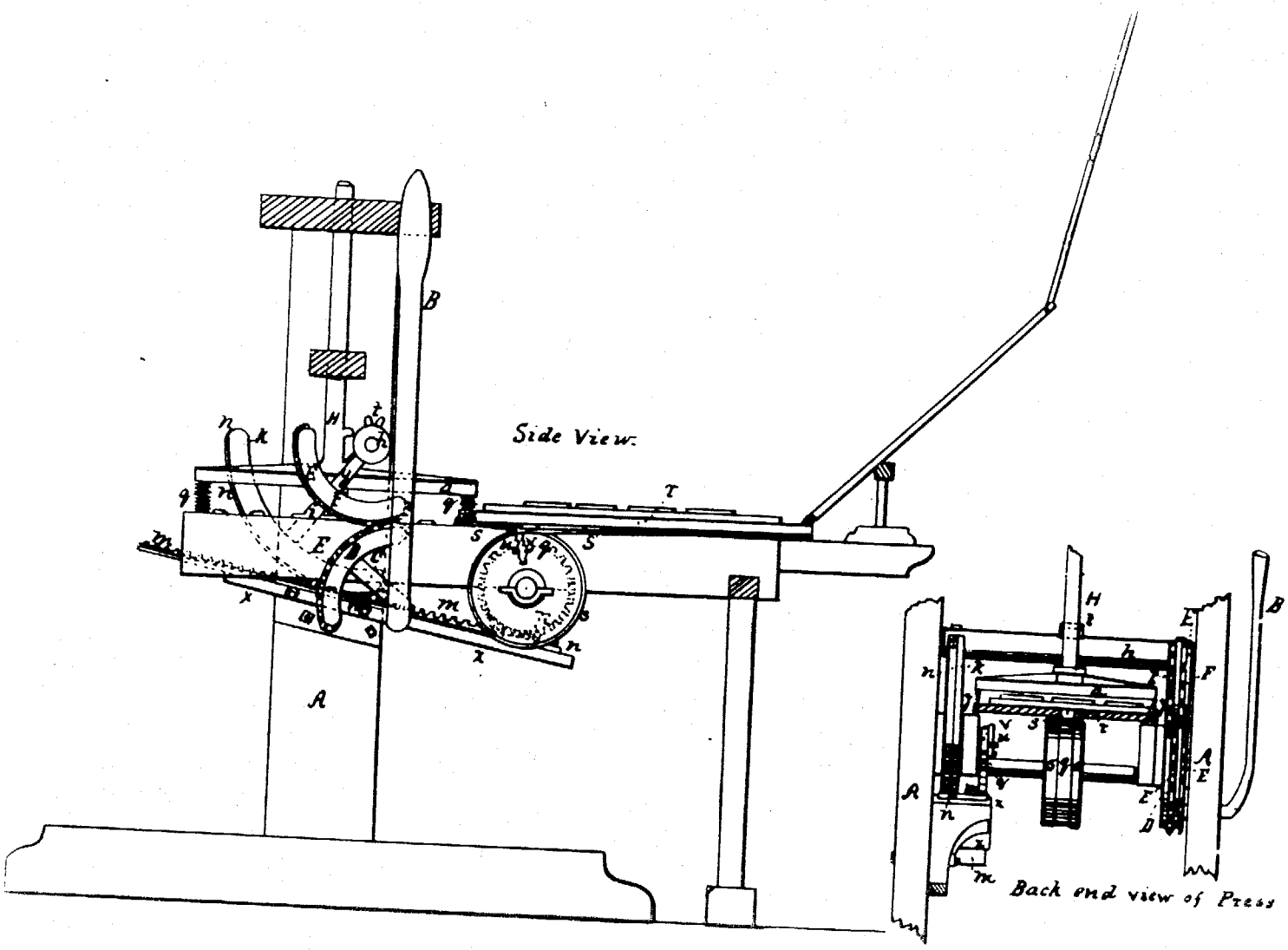

David Pearson
Letters Patent

1970X

The Schedule referred to in these Letters Patent and making part
of the same containing a description in the words of the said David
Pearson himself of his improvement in the Printing Press.

The frame is nearly similar in shape and size of the common
printing presses, and contains four levers, three segments of a circle,
one roller, one axle, two cogs, one cog wheel, four springs, one stop-
per and lever, and one inclined plane. placed as follows viz. The first
lever or bar, in a perpendicular line on the side of the press by which
the press is worked. There is attached to the lower end of the bar
a second lever on which is a segment of a circle, which is connect
ed with an upright chain force. The second segment is connect
ed with the upper end of the chain forces, by four chains, two to
each segment, and the segment is fastened to a third lever which
turns the Roller, at the other end of the Roller is fastened a fourth
lever, and the third segment is connected with the end of the fourth
Lever. Attached to the third segment is a cog force fastened by two
leather straps. this cog force carries the cog wheel which moves the rounce
wheel, which rounce wheel, carries the carriage in and out, connected
by three leather straps fastened to the carriage and Rounce wheel.
The press force is carried down by two cogs fastened to the side of the
Roller, moving the bar or lever downward ninety degrees, carries in the
carriage and gives the impression on the paper. and moving the same
upward the same distance, carries out the carriage which brings
out the form; these two motions are made by the bar, and while acting
on the one does not act on the other. There is fastened to the cog wheel
a stopper and lever to stop the cog wheel when it comes round
to the vacancy of cogs, that the cog force, may slide by when the im-
pression is given, and when this cog force returns a piece of steel
fastened to it projecting out half an inch strikes the stopper or
Lever and turns the cog wheel into its gearing. The inclined

1710X plane is to keep the cog force close to the mannery in the cage in the cog wheel. The plan shows are to hold up the platen and the rate is the lever.

Witnesses
Enoch Wilcomb
Joshua Wilcomb

David Pearson

Drawing Made
A.L.Pc (396 Words)